United States Patent [19]

Disteldorf et al.

[11] 4,373,088
[45] Feb. 8, 1983

[54] TRANSPARENT POLYAMIDES FROM BRANCHED CHAIN DIAMINE AND CYCLOALIPHATIC DIAMINE

[76] Inventors: Josef Disteldorf, Am Sengenhoff 2a; Werner Hübel, Am Birnenbruch 34, both of 4690 Herne 1; Siegfried Brandt, Grabenstrasse 8; Hans-Jürgen Haage, Gauss-strasse 13, both of 4690 Herne 2, all of Fed. Rep. of Germany

[21] Appl. No.: 147,960

[22] Filed: May 9, 1980

[30] Foreign Application Priority Data

May 26, 1979 [DE] Fed. Rep. of Germany ....... 2921495

[51] Int. Cl.³ .............................................. C08G 69/26
[52] U.S. Cl. .................... 528/338; 528/339; 528/340; 528/346; 528/347; 528/349
[58] Field of Search ............... 528/340, 338, 339, 347, 528/346, 349

[56] References Cited

U.S. PATENT DOCUMENTS 3,980,621 9/1976 Campbell et al. ................... 528/349
4,207,411 6/1980 Shue .................................... 528/349

*Primary Examiner*—Harold D. Anderson
*Attorney, Agent, or Firm*—Oblon, Fisher, Spivak, McClelland & Maier

[57] ABSTRACT

Transparent polyamides have repeating structural units of the formula

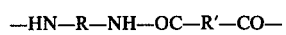

wherein R' is the hydrocarbon radical of terephthalic acid or isophthalic acid and R comprises 60–95 mole percent of a divalent hydrocarbon radical including 5-methylnonamethylene, 2,4-dimethyloctamethylene and 2,4,6-trimethylheptamethylene and 40–5 mole percent of a cyclic divalent hydrocarbon radical of the formula

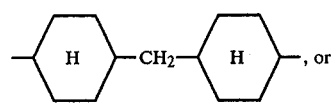

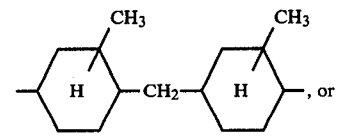

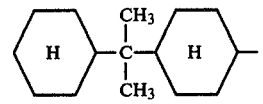

The polyamides so prepared can be used for building components and for fibers and sheets.

6 Claims, No Drawings

TRANSPARENT POLYAMIDES FROM BRANCHED CHAIN DIAMINE AND CYCLOALIPHATIC DIAMINE

BACKGROUND OF THE INVENTION

The invention relates to copolyamides prepared from terephthalic acid (TA) and/or isophthalic acid (IPA) or their respective esters or ester forming derivatives, and mixtures of diamines containing 5-methylnonamethylenediamine-1,9 (5-MNDA), optionally of technical grade, containing isomeric diamines, and p,p'-diaminodicyclohexylmethane or its derivatives.

U.S. Pat. No. 2,752,328 discloses polyamides prepared from terephthalic acid and diamines having a methyl-substituted hydrocarbon chain. The diamines used have terminal amino groups and a methyl-substituted hydrocarbon chain of 6-8 atoms, and the total number of C-atoms should not exceed the value obtained by subtracting the number of methyl groups from 10. The polyamides so prepared exhibit good textile properties, especially with respect to a high zero strength temperature and slight shrinkage. However, only small departures from the specified amines (see column 6, lines 58-65) result in polyamides and fibers which display undesirable properties. Thus, when, in Example 11, 5-MNDA is used as the diamine for comparison, the polyamide and fibers prepared exhibited a shrinkage in boiling water of 78%, a zero-strength temperature of 160° C. and tenacity of 1.9 g/denier.

German Offenlegungsschrift No. 23 12 218 describes linear terephthalamide polymers which consist at least principally of repeating units of the formula

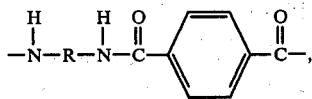

wherein, in this formula, R=5-methylnonamethylene, 2,4-dimethyloctamethylene, and 2,4,6-trimethylheptamethylene, and at least 50%, preferably at least 70%, and especially preferably at least 80% of the R groups are 5-methylnonamethylene groups. Although according to the Offenlegungsschrift the polymers can contain up to 20% by weight of other repeating structural units, in general the polymers are comprised of at least 90% by weight, preferably at least 95% by weight, and most preferably at least 98% by weight of repeating structural units of the $C_{10}$-diamine terephthalamide defined in the formula above. The linear polymers which consist essentially of the $C_{1-10}$-diamine terephthalamide of this formula as the sole repeating structural unit are distinguished by especially good properties. Among these properties are improved values for the shrinkage in boiling water, the zero strength temperature, and the tenacity. Such polamides are here characterized as linear since they are fusible and soluble in the usual solvents for polyamides, such as m-cresol, formic acid, and the like. Polyamides of this structure, contrary to the assertion of U.S. Pat. No. 2,752,328, are also well suited to the preparation of fibers.

A disadvantage of the polyamides disclosed in German Offenlegungsschrift No. 23 12 218 prepared from 5-MNDA and TA is their relatively low glass transition temperature, which is at most 120° C.

SUMMARY OF THE INVENTION

It is desirable to increase the glass transition temperature both for use in fibers and sheets, for example, for certain technical applications, and for use as molded articles for heat-resistant structural components. A further advantage is that the polyamides at the same time become transparent.

The field of the invention, accordingly, is transparent polyamides having repeating structural units of the formula:

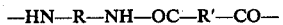

wherein R' is the hydrocarbon radical of terephthalic acid or isophthalic acid and R comprises 60-95 mole percent, preferably 60-80 mole percent, of a divalent hydrocarbon radical including (a) 5-methylnonamethylene, (b) 2,4-dimethyloctamethylene, and (c) 2,4 6-trimethylheptamethylene, wherein the mole ratio a:b:c is between 1:0:0 and 0.50:0.45:0.05, preferably between 1:0:0 and 0.80:0.15:0.05, and 40-5 mole percent, preferably 40-20 mole percent, of a cyclic divalent hydrocarbon radical of the formula:

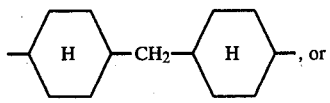

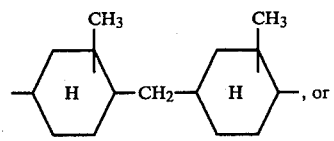

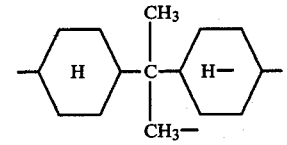

wherein the polyamides have a glass transition temperature in the range between 125° and 180° C.

A known method for increasing the glass transition temperature is to replace a portion of the open chain diamine component in a polyamide with cyclic diamines, especially with diamines which have an unsymmetrical structural formula. Thus, e.g., in British Pat. No. 1,255,483 it is taught, starting from polyamides of 5-MNDA and dicarboxylic acids, especially TA, to replace a portion of the 5-MNDA, for example, by isophoronediamine (IPD) and m-xylylenediamine. The polyamide thereupon loses it crystallinity and becomes transparent.

The partial replacement of 5-MNDA in a polyamide from 5-MNDA and TS by other diamines, among them p,p'-diaminodicyclohexylmethane (D), is also mentioned in German Offenlegungsschrift No. 23 12 218. However, according to the glass transition temperature, only a proportion of less than 5 mole percent of D in the entire amount of diamine was used.

When the aliphatic diamines in a polyamide are replaced by cyclic diamines, it is also known that, while the glass transition temperature can be greatly increased, the toughness simultaneously decreases, e.g., as measured by the notched-bar impact test according to DIN 53 453. At the same time a loss of crystallinity is observed, which can be measured as the heat of fusion by differential scanning Calorimetry (DSC). When for example, according to British Pat. No. 1,255,483, 20 mole percent of the diamine in a polyamide from 5-MNDA and TA is replaced by IPD, the glass transition temperature of the polymer so obtained (Product 1) increases from 115° C. to 140° C., and the heat of fusion decreases from 11 cal/g to 1-2 cal/g. This copolyamide is transparent. However, in contrast to the polyamide from 5-MNDA and TA, the notch toughness decreases from 25 KJ/m$^2$ to 18-19 KJ/m$^2$. KJ is the abbreviation for kilojoule. These values correspond to the data of British Pat. No. 1,255,483.

DESCRIPTION OF THE PREFERRED EMBODIMENTS

The same behavior is to be expected when other cyclic diamines are introduced. However, when 20 mole percent of the diamine in a polyamide from 5-MNDA and TA is replaced by p,p'-diaminodicyclohexylmethane, a polyamide (Product 2) is obtained whose glass transition temperature is increased to about 145° C. and whose heat of fusion is decreased to 1-2 cal/g, corresponding to the values for product 1.

On the contrary, however, the notch toughness of Product 2 is not decreased as expected, but is even increased about 20%.

A further advantage of the products of this invention is their resistance to hot water. If a thin sheet of Product 2 is exposed to superheated steam in a pressure vessel at 120° C. for 3 hours, no alteration can be detected, while a sheet of Product 1 becomes very cloudy and deformed. After soaking in hot water at 80° C. for 14 days Product 1 even became tacky, while Product 2 was unaffected. Even the basic material of the polyamides of the invention, the homopolyamide of 5-MNDA and TA is not affected by sterilization or by soaking in hot water.

5-Methylnonamethylenediamine-1,9, which is used in the practice of this invention, is a known compound. It is prepared, for example, by hydrogenation of the dinitrile obtained from isobutene and acrylonitrile. Technical grade 5-MNDA also contains isomers, e.g., 0-50 mole percent, generally less than 20 mole percent or 8 mole percent, of 2,4-dimethyloctanediamine-1,8, 0-12 mole percent, generally less than 1 mole percent, of 2,4,6-trimethylheptanediamine-1,7, and impurities consisting of various methylated C$_{10}$-diamines in amounts perhaps up to 3 mole percent, but in practice less than 1 mole percent. This diamine mixture, having a composition not defined in detail, can also contain, in addition, unsaturated diamines. Consequently, the bromine number of the mixture can be as high as 10, but is preferably less than 5 or less than 1.

The other cyclic diamines used in the practice of the invention, 4,4'-diaminodicyclohexylmethane, 3,3'(or 2,2')-dimethyl-4,4'-diaminodicyclohexylmethane, and 4,4'-diaminodicyclohexylpropane are commercially available chemicals, which can be purified by distillation if necessary.

The preferred dicarboxylic acid used in this invention is terephthalic acid, which provides higher glass transition temperatures. However, when high melt viscosity is a problem in operation, then isophthalic acid is preferred, especially mixtures of TH and IPA which contain up to 50%, preferably 30%, of IS. Up to 10% of the aromatic dicarboxylic acids can be replaced by aliphatic dicarboxylic acids, e.g., adipic acid or decanedicarboxylic acid, to decrease the melt viscosity.

Any known condensation process can be used to prepare the polyamides of the invention.

For example, a mixture of diamine(s) and dicarboxylic acid(s) or of diamine(s), dicarboxylic acid(s), and water, or a preformed salt of the diamine(s) and the dicarboxylic acid(s), with or without the addition of water, can be heated to a high temperature, whereby the water distills off and the polyamide is formed. However, derivatives of the diamines or acids can also be used, e.g., esters. The melt viscosity of the polyamide is very high; therefore, it is advantageous to conduct the condensation in an extruder which is equipped with a degassing apparatus.

The reduced specific viscosity ($\eta$-red) can be adjusted, according to circumstances, up to 5 dl/g or more (measured in cresol at a concentration of 0.5 g per 100 ml of solvent).

The preferred polyamides are those having an $\eta$-red value of 0.7-2.5. The adjustment is performed in the usual way, e.g., by controlling the excess of amine or acid or by addition of monofunctional acids and amines. It is also possible to add catalysts and stabilizers and the other usual adjuvants.

The polyamides so prepared can be used for building components and for fibers and sheets.

The following examples illustrate Applicants' invention.

EXAMPLE 1

0.9 Moles of 5-methylnonamethylenediamine (5-MNDA), 0.1 mole of p,p'-diaminodicyclohexylmethane (PACM), and 1.0 mole of terephthalic acid (TA) were heated in 1 liter of methanol at reflux temperature for 2 hours with stirring. After cooling the salt was collected by filtration and dried. Two hundred fifty grams of the salt were placed in a three-necked flask, equipped with a metal stirrer and connected to a column provided with a cold finger, and were heated gradually to about 290° C. After the water had been distilled off, a melt was obtained which was heated an additional 2 hours under a nitrogen gas purge. After cooling the glass was broken off and the polymer was pulverized. The reduced specific viscosity ($\eta$-red) was 1.6 dl/g. The glass transition temperature (T$_g$) was determined to be 130° C., and the notch toughness by DIN 53 453 was 27 KJ/m$^2$.

EXAMPLE 2

Into a 1 liter stirred reactor made of V$_4$A steel were charged

| | |
|---|---|
| 139.5 g | a mixture of C$_{10}$—diamines comprising: 64.0% 5-MNDA 34.0% 2,4-dimethyloctanediamine-1,8 1.2% 2,5,6-trimethylheptanediamine-1,7, and small amounts of unidentified by-products |
| 42.5 g | PACM |
| 49.8 g | IPA |
| 116.3 | TA |
| 0.6 g | acetic (mw = 60.05) |
| 100. g | water (mw = 18.16) |

The mole percent of the C$_{10}$-diamines is about 80 as compared to about 20 of PACM. Oxygen was excluded while the mixture was heated for 1 hour at 240° C., whereby an autogenous pressure of about 20 bar was generated. Then the water was distilled off with stirring and with a further increase in temperature to 290° C. After a further 2 hours at this temperature, the product was discharged through a bottom valve using nitrogen gas pressure. The following properties were determined:

η-red = 1.7 dl/g;   $T_g$ = 145° C.
notch toughness (DIN 53 453) = 28 KJ/m$^2$

EXAMPLE 3

Into a 1 liter stirred reactor made of V$_4$A steel were charged

| | |
|---|---|
| 139.2 g | 5-MNDA |
| 42.6 g | PACM |
| 194.2 g | TA dimethyl ester |
| 200.0 g | water |

The mole percent of 5-MNDA is about 80 as compared to about 20 of PACM. The mixture was heated at reflux temperature for 3 hours with stirring. Then the liberated methanol was distilled through a column, followed by the greater part of the water. The reactor was then sealed and heated under pressure to 240° C. The rest of the water was then distilled off while the temperature was further increased to 290° C. After 1 hour at this temperatue, the product was discharged through the bottom valve by nitrogen pressure.

The following properties were determined:

η-red = 1.2 dl/g   $T_g$ = 160° C.
notch toughness by DIN 53 453: 26 KJ/m$^2$

EXAMPLE 4

In a 1 liter stirred reactor made of V$_4$A steel were charged

| | |
|---|---|
| 121.8 g | about 70 mole %) a mixture of diamines comprising 88% 5-MNDA and 12% 2,4-dimethyloctanediamine-1,8 |
| 63.9 g | (about 30 mole %) PACM |
| 132.9 g | TA |
| 200.0 g | water |

The mixture was heated for 1 hour at 220° C. and the water was then slowly distilled off. When the pressure had fallen to 20 bar, the distillation was resumed and the temperature was increased until 295° C. was reached. This temperature was maintained for 1 hour, after which the product was discharged through the bottom valve under nitrogen pressure.

The following properties were determined:

η-red = 1.2 dl/g   $T_g$ = 160° C.
notch toughness by DIN 53 453: 26 KJ/m$^2$

EXAMPLE 5

Into a 1 liter stirred reactor made of V$_4$A steel were charged

| | |
|---|---|
| 130.5 g | (about 75 mole %) a mixture of C$_{10}$—diamines comprising 98.5% 5-MNDA and up to 1.5% 2,4-dimethyloctanediamine-1,8 |
| 53.0 g | (about 25 mole %) PACM |
| 166.0 g | TA |
| 100.0 g | water |

The mixture was heated for 1 hour at 220° C. and the water was then slowly distilled off. When the pressure had fallen to 20 bar, the distillation was resumed and the temperature was increased until 295° C. was reached. This temperature was maintained for 1 hour, after which the product was discharged through the bottom valve under nitrogen pressure.

The following properties were determined:

η-red = 1.4 dl/g   $T_g$ = 155° C.
notch toughness by DIN 53 453: 27 KJ/m$^2$

EXAMPLE 6

Into a 1 liter stirred reactor were charged

| | |
|---|---|
| 158.0 g | (about 80 mole %) a mixture of diamines comprising 88% 5-MNDA and 12% 2,4-dimethyloctanediamine-1,8- |
| 24.0 g | PACM |
| 28.0 g | (the 24.0 g and 28.0 g totalling about 20 mole %) 3,3'-dimethyl-4-4'diminodicyclohexylmethane |
| 192.0 g | TA |
| 100.0 g | water |
| 0.2 g | phosphorous acid |

The mixture was heated for 1 hour at 230° C. with stirring. Then the water was distilled off. When the pressure had fallen to 15 bar the distillation was resumed, and the temperature was increased until the product reached a temperature of 297° C. and the pressure had fallen to 0. After a further half hour the product was discharged under nitrogen pressure.

The following properties were determined:

η-red = 1.4 dl/g   $T_g$ = 160° C.
notch toughness by DIN 53 453: 25 KJ/m$^2$

EXAMPLE 7

Into a 1 liter stirred reactor were charged

| | |
|---|---|
| 158.0 g | (about 79 mole %) a mixture of diamines comprising 88% MNDA and 12% 2,4-dimethyloctanediamine-1,8 |
| 24.0 g | (about 21 mole %) PACM |
| 28.0 g | 4,4'diaminodicylohexylpropane (mw = 238.41) |
| 192.0 g | TA |
| 100.0 g | water |
| 0.2 g | phosphorous acid |

The mixture was heated for 1 hour at 230° C. with stirring. Then the water was distilled off. When the pressure had fallen to 15 bar the distillation was resumed, and the temperature was increased until the product reached a temperature of 300° C. and the pressure had fallen to 0. After a further half hour, the product was discharged under nitrogen pressure.

We claim:

1. A solid transparent polyamide consisting of repeating structural units of the formula

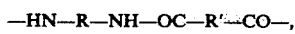
—HN—R—NH—OC—R'—CO—, in which R' is the hydrocarbon radical of terephthalic acid and R is 60–95 mole percent of a divalent hydrocarbon radical of the compounds (a), 5-methylnonamethylene, (b) 2,4-dimethyloctamethylene, and (c) 2,4,6-trimethylheptamethylene, wherein the mole ratio a:b:c is between 1:0:0 and 0.50:0.45:0.05, and 40–5 mole percent of a divalent hydrocarbon radical of the formula

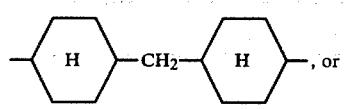

or

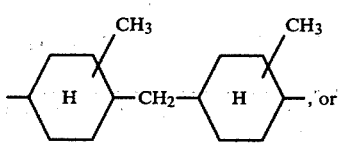

or

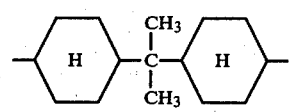

wherein the polyamide has a glass transition temperature of 125° to 180° C.

2. A solid transparent polyamide consisting of repeating structural units of the formula:

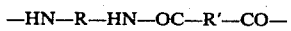
—HN—R—HN—OC—R'—CO— and

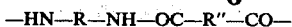
—HN—R—NH—OC—R"—CO— in which R' is the hydrocarbon radical of terephthalic acid, R" is divalent radical of at least one aliphatic dicarboxylic acid in an amount upto 10% of R' and R is 60–95 mole percent of a divalent hydrocarbon radical of the compounds (a), 5-methylnonamethylene, (b) 2,4-dimethyloctamethylene, and (c) 2,4,6-trimethylheptamethylene, wherein the mole ratio a:b:c is between 1:0:0 and 0.50:0.45:0.05, and 40–5 mole percent of a divalent hydrocarbon radical of the formula

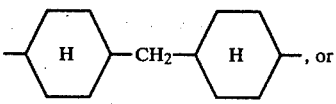

, or

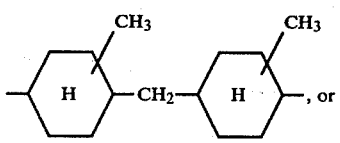

, or

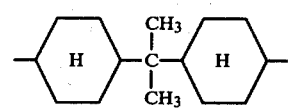

wherein the polyamide has a glass transition temperature of 125° to 180° C.

3. The polyamide of claim 2 wherein the aliphatic dicarboxylic acid is adipic acid or decanedicarboxylic acid.

4. The polyamide of claim 1 wherein R is about 80 mole percent of 5-methynonamethylene and about 20 mole percent of bis (4-aminocyclohexyl) methane.

5. The polyamide of claim 1 wherein R is about 70 mole percent of 5-methylnonamethylene and about 30 mole percent bis (4-aminocyclohexyl) methane.

6. The polyamide of claim 1 wherein R is about 75 mole percent of 5-methylnonamethylene and about 25 mole percent of bis (4-aminocyclohexyl) methane.

* * * * *

UNITED STATES PATENT AND TRADEMARK OFFICE
CERTIFICATE OF CORRECTION

PATENT NO. : 4,373,088

DATED : February 8, 1983

INVENTOR(S) : Josef Disteldorf et al.

It is certified that error appears in the above-identified patent and that said Letters Patent is hereby corrected as shown below:

On the title page insert:

--[73]  Assignee: Chemische Werke Huls Aktiengesellschaft

Fed. Rep. of Germany --

*Signed and Sealed this*

*Fourteenth* Day of *June 1983*

[SEAL]

*Attest:*

DONALD J. QUIGG

*Attesting Officer*  *Acting Commissioner of Patents and Trademarks*